United States Patent
Thompson et al.

(10) Patent No.: US 9,576,041 B2
(45) Date of Patent: Feb. 21, 2017

(54) USER SPECIFIC DATABASE QUERYING METHOD AND APPARATUS

(75) Inventors: Simon G Thompson, Ipswich (GB); Thuc D Nguyen, Ipswich (GB); Yang Li, Ipswich (GB); Hamid Gharib, Ipswich (GB); Nick Giles, York (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1907 days.

(21) Appl. No.: 12/096,847

(22) PCT Filed: Nov. 29, 2006

(86) PCT No.: PCT/GB2006/004463
§ 371 (c)(1),
(2), (4) Date: Jun. 10, 2008

(87) PCT Pub. No.: WO2007/068881
PCT Pub. Date: Jun. 21, 2007

(65) Prior Publication Data
US 2009/0012949 A1    Jan. 8, 2009

(30) Foreign Application Priority Data
Dec. 13, 2005 (EP) .................................. 05257629

(51) Int. Cl.
*G06F 17/30* (2006.01)
(52) U.S. Cl.
CPC ... *G06F 17/30587* (2013.01); *G06F 17/30867* (2013.01)
(58) Field of Classification Search
CPC ............................................... G06F 17/30867

USPC . 707/999.003, 703, 706, 767, 784; 797/703, 706, 767
See application file for complete search history.

(56) References Cited

U.S. PATENT DOCUMENTS

| | | | |
|---|---|---|---|
| 6,327,590 B1 * | 12/2001 | Chidlovskii et al. | ......... 707/734 |
| 6,662,215 B1 | 12/2003 | Moskowitz et al. | |
| 6,691,106 B1 | 2/2004 | Sathyanarayan | |
| 7,203,725 B1 * | 4/2007 | Gilmour et al. | .............. 709/206 |
| 7,392,249 B1 * | 6/2008 | Harris et al. | |
| 2002/0087526 A1 | 7/2002 | Rao | |

(Continued)

FOREIGN PATENT DOCUMENTS

WO        98/53593        11/1998

OTHER PUBLICATIONS

International Search Report for PCTGB2006/004463 mailed Nov. 19, 2007.
Written Opinion for PCT/GB2006/004463 mailed Nov. 19, 2007.

*Primary Examiner* — Mariela Reyes
*Assistant Examiner* — Soheila Davanlou
(74) *Attorney, Agent, or Firm* — Nixon & Vanderhye P.C.

(57) ABSTRACT

The present invention relates to the field of database technology, and to the automatic generation of search queries. The present invention provides a method of generating a database query, the method comprising: receiving a user selection of one of a number of predetermined generic database queries from a user; automatically identifying user specific data from user profile data corresponding to the user by applying the user profile data to a number of predetermined query statements associated with the selected generic query; automatically applying the user specific data to a number of user specific generator query statements in order to generate one or more user specific queries.

11 Claims, 6 Drawing Sheets

(56) References Cited

U.S. PATENT DOCUMENTS

| | | | |
|---|---|---|---|
| 2002/0150093 A1 | 10/2002 | Ott et al. | |
| 2003/0050865 A1* | 3/2003 | Dutta et al. | 705/27 |
| 2003/0093409 A1 | 5/2003 | Weil et al. | |
| 2003/0169284 A1 | 9/2003 | Dettinger et al. | |
| 2005/0071328 A1* | 3/2005 | Lawrence | 707/3 |
| 2005/0076024 A1* | 4/2005 | Takatsuka et al. | 707/3 |
| 2005/0154617 A1* | 7/2005 | Ruggieri et al. | 705/4 |
| 2005/0267887 A1* | 12/2005 | Robins | 707/9 |
| 2006/0014131 A1* | 1/2006 | Bigus | 434/362 |
| 2006/0085391 A1* | 4/2006 | Turski et al. | 707/3 |
| 2006/0167864 A1* | 7/2006 | Bailey et al. | 707/3 |
| 2006/0190461 A1* | 8/2006 | Schaefer | 707/100 |
| 2010/0153874 A1* | 6/2010 | McKinney | 715/781 |

\* cited by examiner

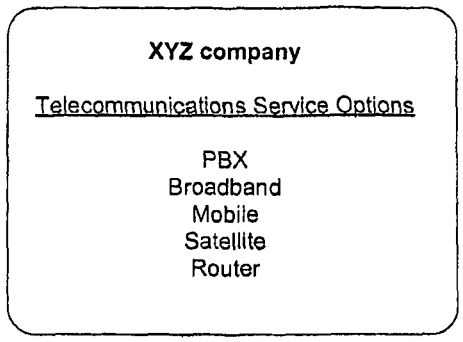

XYZ company

<u>Telecommunications Service Options</u>

PBX
Broadband
Mobile
Satellite
Router

210

PBX Options

| No. Users | | Services Required | | Service Reach | |
|---|---|---|---|---|---|
| 1-10 | ○ | Conferencing | ○ | 0-20m | ○ |
| 10-100 | ○ | Fax | ○ | 20-40m | ○ |
| 100-1000 | ○ | Video | ○ | <100m | ○ |
| | | Chat | ○ | | |
| <u>Install Site Size</u> | | Broadband internet | ○ | <u>Service Assurance</u> | |
| <2m³ | ○ | <u>Support Options</u> | | 99% | ○ |
| 2m³-4m³ | ○ | | | 99.99% | ○ |
| >4m³ | ○ | Bronze | ○ | 99.999% | ○ |
| | | Silver | ○ | | |
| | | Gold | ○ | | |

220

<u>User Query filters</u>
PBX
10-100
<2m3
video;broadband internet
gold
20-40m
99.999%

USER SPECIFIC DATABASE QUERYING METHOD AND APPARATUS

This application is the U.S. national phase of International Application No. PCT/GB2006/004463 filed 29 Nov. 2006 which designated the U.S. and claims priority to European Patent Application No. 05257629.5 filed 13 Dec. 2005, the entire contents of each of which are hereby incorporated by reference.

FIELD OF THE INVENTION

The present invention relates to the field of database technology, and to the automatic generation of search queries.

BACKGROUND OF THE INVENTION

Service providers such as on-line travel agents, book stores, or IT service suppliers typically provide a database of their available services together with a user interface comprising a series of interlinked web-pages. These web-pages include the facility for a user to enter data specific to their requirements, such as a holiday destination and period for example in order to search for available flights and/or hotels. Similarly a user may search for a book using category or author keywords for example. In each case the web-site will return a number of results of goods and/or services which match the user-entered user-specific requirements. The user can then review these results for appropriate goods and/or services. However typically a large number of results are returned, especially if many service providers' web-sites are queried. The user may then filter or order the results according to further criteria, such as list the results from lowest to highest price, or filter on flights leaving from the user's local airport or using a particular airline. Alternatively the user may enter a detailed set of options presented on the web-site in order to reduce the number of results returned and their relevance to the user. In both cases this is time consuming for the user, and often the user will not know what sort of information about them will be most relevant to controlling the search results.

Personalising XML Text Search in Piment" by Sihem Amer-Yahia et al at the following http website: www.vldb2005.org/program/slides/demo/s1310-amer-yahia.ppt discloses a method of supplementing or customising user queries by parsing them for keywords, and adding related keywords from a thesaurus for example. However whilst this may provide the results the user intended, it does so at the expense of a lot more results.

US2003050865 discloses a system which attempts to solve this problem by maintaining a detailed user profile on the user's client which can then be applied to incoming results from service provider web-sites in order to filter out results that don't meet the requirements defined in the user profile. In one of the examples given, the user wants to find a hotel and has various data in their user profile such as: is a wheelchair user; has various discount coupon schemes; frequent flier data; hobbies; hotel preferences such as amenities wanted, smoking or non-smoking; and so on. The user then enters a general hotel query including constraints such as location, dates, and price range. The client agent then shortlists or filters the results returned based on the criteria in the user profile. The client agent then sends selective queries based upon the user profile directly to the short-listed service provider servers. The hotel or other service provider servers then query their knowledge base to answer the selective queries and provide this data to the client agent which in turn presents it to the user. However this requires that the short-listed servers are able to process these types of selected queries. This also requires a lot of processing power by the client which must shortlist a large number of results, send the selected queries and receive the further results for presentation to the user. For client agents installed on wireless devices, a large amount of bandwidth is also consumed in sending two sets of queries, and receiving two sets of results. Also the user has to enter and remember the information for the general query which is inconvenient for the user. This is exacerbated on a device with a constrained interface (a hand held for example) making the process more tedious, and in addition a lot of screen space could be consumed.

SUMMARY OF THE INVENTION

In general terms in one aspect the present invention provides a method of generating a database query and/or searching a database in which a user profile is used to refine one or more generic queries into user specific queries in order to recover database information relevant to the user. This is achieved with reduced user involvement and thereby a more convenient user interface, together with reduced use of processing and communications resources.

In another aspect there is provided a method of generating a database query for an information or services database. The method uses a number of high level or generic queries which are each associated with a number of predetermined query statements relating to more specific or detailed queries. The method receives a user selection of one of a number of the predetermined generic queries from a user of the method or system. The method then retrieves user profile data corresponding to the user, for example from a user profile database. This user profile data is then applied to the various predetermined query statements associated with the selected generic query, in order to identify user specific data, or user data which is relevant to the selected generic query. This identified user specific data is then applied to a number of user specific generator query statements associated with the selected generic query in order to generate one or more user specific queries. The user specific queries are related to or derived from the generic queries, but are selected depending on the user's circumstances or data.

In an embodiment, the user profile data is in a data statements or table format comprising a number of user data statements each having a relationship identifier and two or more data items. The data items corresponding to the user are then substituted into the predetermined query statements and the resulting data statement matched against the user's user data statements. The matching data items then form the user specific data. These may be further refined by applying them to other predetermined query statements and removing data items which don't result in matches with the user data statements. However other user profile data formats or structures could alternatively be used, as well as alternative methods of determining relevant user specific data.

There is also provided apparatus or systems to implement the above defined methods.

In an embodiment an information technology (IT) service provider supports a web-site which includes a user interface that provides a number of generic query options about the services provided. A user profile for a number of users is maintained in a data store by the service provider, and may correspond to a customer database for example. After selecting a generic query, the web-site server is configured to determine user data associated with the particular user, and which is relevant to the generic query. The server uses this relevant user data to qualify the generic query in a predetermined way by retrieving knowledge on the applicability and structure of queries from a data store and then applying a set of predetermined rules to create personalised queries for the user. Typically a plurality of user specific queries will be generated and which are derived from the selected generic query. These user specific queries are then forwarded to and processed by an IT services database supported by the service provider, and the results returned provided to the user via the user interface. Because the user specific queries are more constrained or qualified compared with the selectable generic queries, the results returned are more specific or relevant to the users needs, and are fewer in number. Thus the server is not required to process a large number of broadly queried and mostly irrelevant query results against the user profile, but instead defines more specific and relevant queries initially. This reduces the processing power required, and speeds up the provision of the search results to the user. It also reduces the amount of data transferred between a service provider and a user, which is particularly important with the use of mobile devices have limited wireless bandwidth. The embodiment also reduces the burden on the user, by automatically creating relevant user specific or customised queries, rather than requiring the user to input results filters or think up more specific queries. This is particularly difficult for the user where the user does not have detailed knowledge of the sort of data or information they are looking for—for example they may not know what are important factors for the selection of a PBX, and would therefore have difficulty framing more specific queries themselves.

The user interface might also be provided by an intermediary or "broker" which issues the user specified queries to a number of service providers. Further this intermediary might provide services options which require combination or concatenation of services from two or more service providers. Thus for example one service provider may provide private exchange equipment (PBX) according to the user's requirements and a different service provider may provide the technical staff to install such a PBX.

In another aspect there is provided a system for generating a database query, the system comprising a user interface for receiving a user selection from a user of one of a number of predetermined generic database queries. The system may be the web-server of a service provider for example, and coupled to a number of users or customers via the Internet. The system is also coupled to a query statements database having a number of predetermined query statements and user specific query generator query statements associated with respective generic database queries, a user profile database having user profile data associated with the user, and an information or services database comprising data about the service provider's services for example. These three databases may also form part of a larger facility with the system for example, individually or in various combinations. Alternatively the databases and system may be operated by separate entities. The system is arranged to automatically identify user specific data from the user profile data by applying the user profile data to a number of the predetermined query statements associated with the selected generic query; and is further arranged to automatically apply the user specific data to a number of the user specific generator query statements in order to generate one or more user specific queries. The queries may then be used by a search engine to interrogate the information database on behalf of the user.

In another aspect there is provided a user profile database having user profile data corresponding to a number of users, the user profile data being in the format of a series of user data statements for each user, each user data statement having a relationship identifier and two or more data items.

In another aspect there is provided a query statements database comprising a number of sets of predetermined query statements and user specific query generator statements, each set associated with a different generic database query. The query statements comprise a predetermined relationship identifier and a data item variable, and in some cases a predetermined data item. The query generator statements comprise a predetermined relationship identifier, a data item variable, and a search term.

In another aspect there is provided a method of searching, comprising: receiving a user query; customising the user query using some user specific data identified as relevant to the query from user profile, data about the user; searching a database using the customised query; wherein identifying the user specific data is achieved by applying the user profile data to predetermined query statements.

BRIEF DESCRIPTION OF THE DRAWINGS

Embodiments will now be described with reference to the attached drawings, by way of example only and without intending to be limiting, in which:

FIG. 2 illustrates a user interface for the system of FIG. 1;

DETAILED DESCRIPTION

Figure 1:
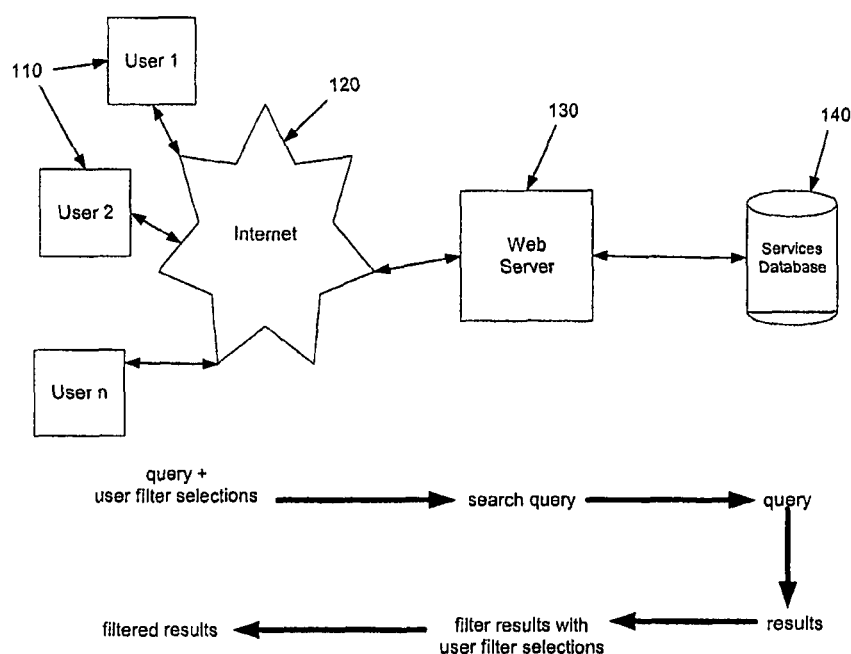
FIG. 1 illustrates a known system for querying a database using user specific data.

Referring initially to FIG. 1, a known system for providing user specific information to a user of a service provider's web-site is shown. The user is aiming to identify relevant products and/or services supplied by the service provider which are relevant to the user's particular circumstances. The system 100 comprises a number of users or customers 110 of the service provider, and having client devices such as computers coupled to the service providers web server 130 via the Internet 120. The web server 130 is also coupled to the service provider's database of supported goods and/or services 160, and is able to query this. Typically a user will select a high level query from the web server's web site, such as PBX equipment, from a high level web page 210 such as that shown in FIG. 2. The user is then typically presented with a more detailed user selections or options page 220 in which the user can specify their PBX requirements. Alternatively, the user may have a predetermined filter list which is stored on their client machine 110 and which is forwarded to the web server 130. A combination of user selections 230 is also illustrated in FIG. 2.

As illustrated in FIG. 1, the web server queries its (goods and/or) services database 160 using the high level or generic query (PBX) and receives a number of "PBX" related search results. The web server 130 then filters the search results according to the user filter selections 230, filtering out search results which do not match the specified conditions. The filtered search results are then forwarded to the user's machine 110 for display to the user.

This method of finding relevant search results is time consuming for the user as they need to find relevant information with which to fill out the selection options 220, and furthermore because only a limited number of selection options can be shown on a practical web interface, there may be further user related or specific information which is not captured by the system and which may have usefully filtered the "PBX" search results, meaning that the user is still presented with many irrelevant search results. This is time consuming and inconvenient for the user.

Figure 3:
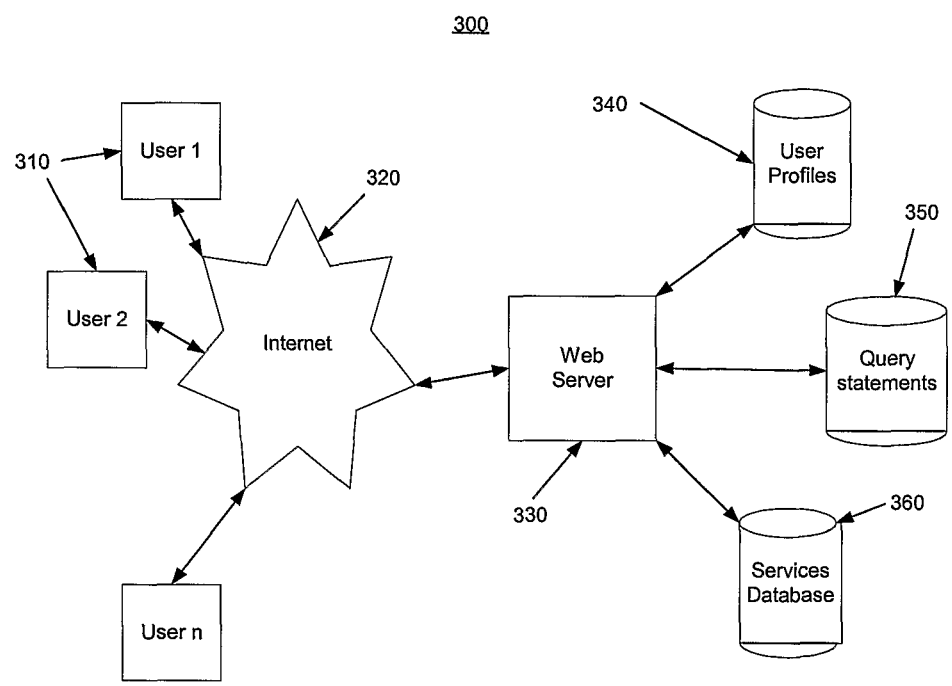
FIG. 3 illustrates a system according to an embodiment.

Referring now to FIG. 3, a system according to an embodiment is illustrated and which may be used by a service provider such as an information technology or telecommunications service provider to support its customer's services needs. The system 300 comprises a number of users 310 such as existing customers and which are coupled to a web server 330 of the service provider via the Internet 320. The web server 330 is also coupled to a user profiles database 340 which contains data about the users 310 or customers. The web server 330 is also coupled to a query statements database 350 which contains conditions or constraints for testing against user data in the user profile database 340 in order to assist in generating user specific search queries from more generic (non-user specific) search queries. The web server 330 is also coupled to a services or information database 360 which contains searchable information or data about the various goods and/or services supported by the service provider, for example a variety of private branch exchange (PBX) equipment with different parameters such as size (both physical and capacity), reliability levels, services supported and so on. The conditions, constraints, or query statements may be structured depending on the data or services stored in the services database 360. For example if the services database 360 only contains information about PBX services, then the query statements in the query statements database 350 will only be related to those PBX services. It may be however that the database is unknown or unstructured so that the user specific queries are generated without knowledge of the services database.

Figure 4:
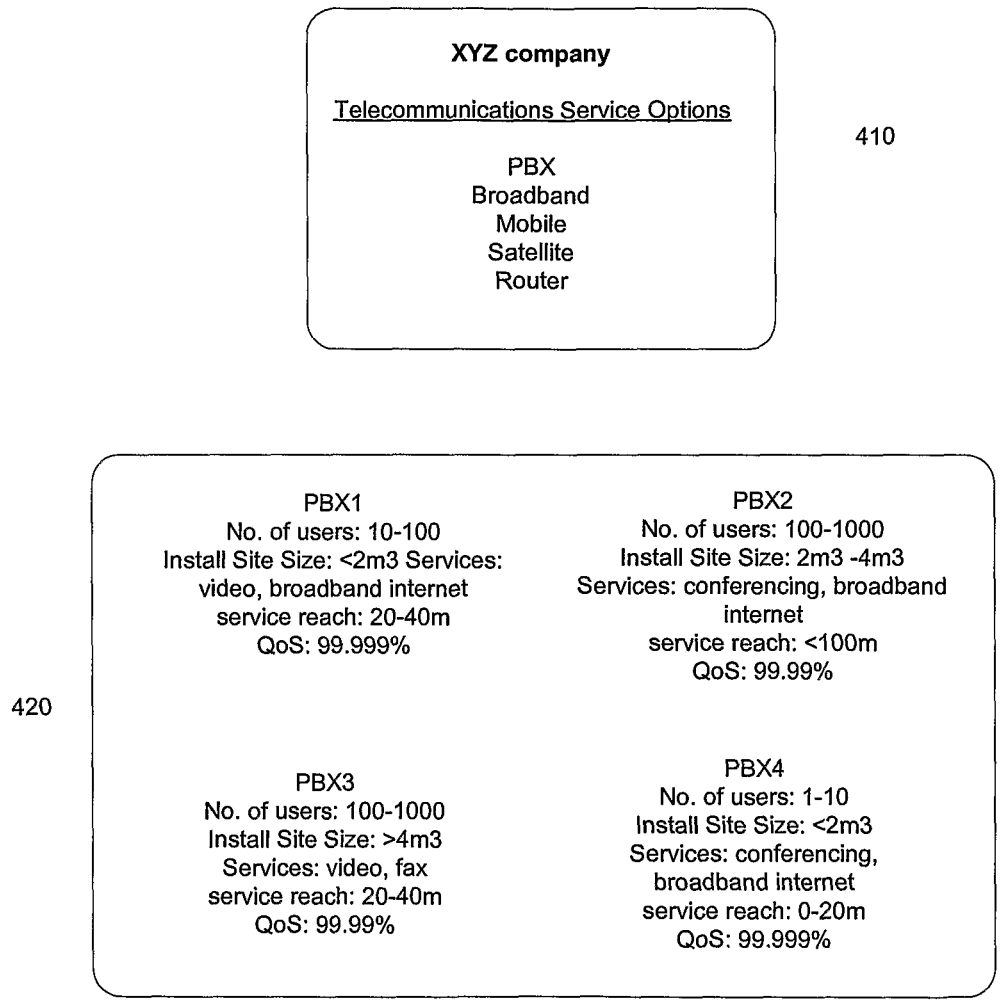
FIG. 4 illustrates a user interface for the system of FIG. 3.

FIG. 4 illustrates web pages or user interface screens which are provided by an embodiment. The high level screen 410 is the same or similar to that (210) of the system of FIGS. 1 and 2, and allows the user to select from various high level product or service options, including the PBX option of screen 210. However instead of then presenting the user with various user specific selection options (220), the system 300 generates a number of user specific queries 420 dependent on the user's circumstances. The system 400 has determined for example that the user has four differing requirements for PBX's, for example because they have four different sites with differing numbers of users, quality of service (QoS) requirements and so on. These user specific queries are generated automatically using information in the user profile database 340 together with suitable query structures contained in the query criteria database 350. The web server 330 is then able to query the services database 360 with the automatically generated user specific queries and return results specific to these queries to the user 310. Alternatively the system may be configured to simply display the generated user specific queries to the user as illustrated in the lower screen 420 of FIG. 4, so that the user can choose which, if any, of the user specific queries they are most interested. For example they may be interested in updating the PBX equipment at only one of their sites and can therefore select one of the user specific options displayed. The web server 330 then queries the services database 360 using the selected user specific query, and returns the results to the user 310 for display.

Figure 5:
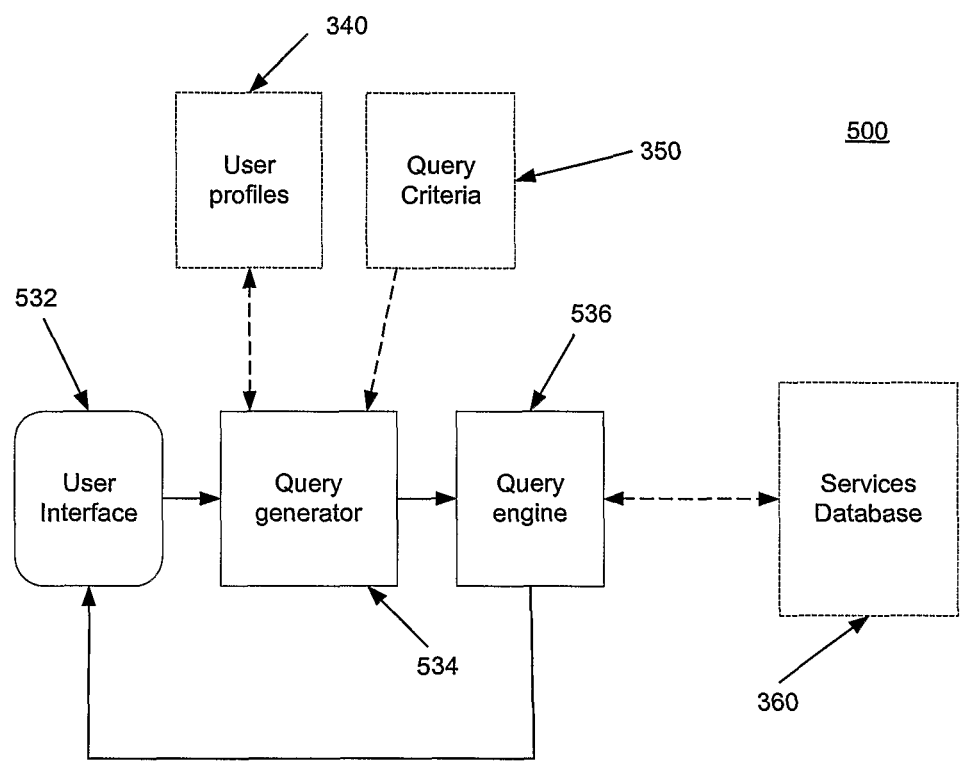
FIG. 5 is a schematic for a query generator for the web server of FIG. 3.

FIG. 5 illustrates the web server 330 of FIG. 3 in greater detail, and which comprises a user interface 532 such as a series of interrelated web-pages, a query generator 534, and a query engine 536. The query generator 534 gathers user profile data from the user profile database 340 depending on the particular user (310) using the interface 532. The query generator 534 also gathers query criteria or statements from the query statements database 350, depending on one or more generic queries selected by the user at the user interface 532. The query engine 536 receives a number of user specific queries generated by the query generator 534, and queries the services database 360. The results of the user specific queries are then fed back from the query or search engine 536 to the user interface 532 for display to the user.

Figure 6:
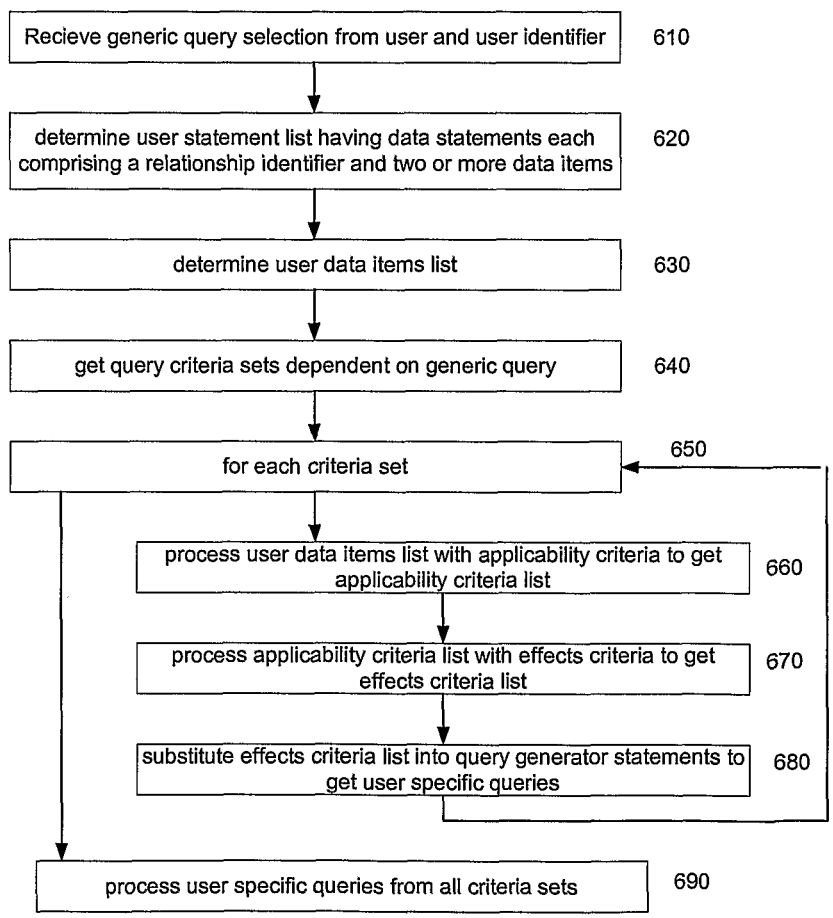
FIG. 6 is a flow chart showing a method of operating the query generator of FIG. 5.

FIG. 6 illustrates how the query generator 534 operates according to an embodiment. The method (600) receives a user identifier such as a customer number together with a generic query such as "PBX" (610). The user identifier may be determined at the user interface 532 by requiring the customer to enter their customer number in an authentication procedure, using cookies stored on the user's computer, or any of a number of well known mechanisms. The selection of one of a number of generic query options can be achieved at the user interface by providing a suitable web page 410 as noted above with respect to FIG. 4.

The method (600) then determines a user statement table (user profile data) having a number of data statements, each comprising a relationship identifier or predicate and two or more data items (620). The user data statements define related information about a user which is true, for example that the address of one of the user's premises or sites is 20 Round Way has an address of address1, Ipswich, UK (address1)—in this case business1 (the site). This would be expressed as address(business1, address1), where "address" is a predicate or relationship identifier, and "business1" and "address1" are data items which are related by the predicate. User statement tables are stored in the user profile database 340, and may be structured as a data table as illustrated in table1 below.

TABLE 1

| Predicate | Data item 1 | Data Item 2 | Data Item 3 |
|---|---|---|---|
| isa | business | business1 | |
| isa | business | business3 | |
| isa | Financial | business1 | |
| noEmployees | cat2 | business1 | |
| geography | ukstd | business1 | |
| lasttwoUsed | business1 | video | broadband |
| address | business3 | anotherAddress | |
| address | business1 | address1 | |
| lasttwoUsed | business3 | video | phone |

This user statement table may alternatively be derived from user profile data stored in the database 340 in a different format. Also different types of user data may be stored in different user data statement tables; for example as shown in Table 2 below.

TABLE 2

| Predicate | Data item 1 | Data item 2 |
|---|---|---|
| Isa | address | address1 |
| installSpace | address1 | cat1 |
| isa | address | address2 |
| installSpace | address2 | cat3 |

Once the various user data statements are identified for the specific user, the method (600) then determines a user data items list (630) which is a grouping of all the individual data items associated with the user. This is taken from the user data statements in the various user profile databases, with the relationship identifiers or predicates removed. This is illustrated in list1 below, any duplicate data items having been removed.

List 1

Business
Financial
business1
cat2
ukstd
video
broadband
address1
cat1
address2
cat3
anotherAddress
business3

The method then determines a number of sets or groups of applicability criteria or query statements, effects criteria or query statements, and user specific query generator statements (640). The applicability query statements identify user profile data which is relevant to the generic query (PBX), thus they gather all user data which might affect the choice of PBX for the user. This is done by using a structure of predetermined applicability query statements stored in the query statement database 350, and which is dependent on the PBX equipment the service provider supports and how their selection might be affected by various parameters. For example PBX equipment has different levels of QoS and correspondingly different cost. The highest QoS level (eg 99.999%) may be required by financial services type businesses, but not by any others, whereas a small consultancy business office may be adequately supported by a lower QoS (eg 99%) and much lower cost PBX. Thus the applicability queries need to identify user data such as whether (or which) customer site(s) support financial services operations. Examples of other factors which will affect the choice of PBX include the number of users per PBX or site, the install size available for the PBX, the services required (eg conferencing, video, etc), support options, service reach, the area (address) in which the PBX will be located and whether interconnecting services are supported by the local communications provider, and so on. All of these factors are built into the applicability criteria or query statements to which the specific user's data from their profile is applied (660).

An example applicability query statement is:
  isa(financial, ?business)

The applicability query statement will typically include a predetermined applicability relationship identifier (isa) and a predetermined applicability data item (financial) together with a variable (?business) suitable for substituting the user's data items.

Thus the system attempts to identify whether the user has any financial services sites; this is the ?business variable. If any are found, then these will be added to the variable's (?business) listing. The system may also try to identify other types of businesses which may affect the choice of PBX, for example hospitals, airports, general office, small-home office. Each condition (eg business is financial) will be grouped with other factors which together will affect the PBX choice. The system therefore proceeds through each applicability criteria group in turn (650, 660, 670, 680) to find whether any of the users data matches these applicability criteria and if so, to generate appropriate user specific queries.

An example set or group of applicability criteria is:

List 2 isa(financial, ?business)
noEmployees(cat2, ?business)
installSpace(?someaddress, cat1)
lasttwoused (?business, ?service1, ?service2)

Here, the condition of whether the business is financial is also qualified by the number of employees or users at the site, the installation space available for the PBX, and the types of services most likely to be used with the PBX. The most likely services are determined by retrieving the last two services used at the site. The applicability criteria set is processed by the system (650). This involves substituting each of the data items in the data item list (list 1) into the variables in the applicability criteria. For example each data item is substituted in turn into the ?business variable of the is a(financial, ?business) applicability criterion; which will give:

isa(financial, Business)
isa(financial, Financial)
*isa.(financial, business 1)*
isa(financial, cat2)
etc These substitutions are then compared with the user statements from the user statement tables (table 1 and 2) to determine any matches. It can be seen that when business1 is substituted (highlighted above) that this matches one of the user statements. This data items (business1) is then added to a listing of results for the ?business variable. This process is repeated for each data items in the data item list (list1), and then in turn for each of the applicability criteria in the set, in order to produce user specific data such as a variables listing or mapping, for example as shown below:

List 3

?business = { business1, business3}
?service1 = {video}
?service2 = {broadband, phone}
?someaddress = {address1}

Once the first set of applicability criteria or query statements are processed (660) and user specific data or a corresponding first applicability criteria list (list 3) of data variables and corresponding data items is obtained, these variables are applied to a corresponding (first) set of effects criteria or query statements (670), examples of which are shown below:

List 4 address (?business, ?someaddress)
lasttwoused (?business, ?service1, ?service2)

The effects query statements will typically include a predetermined effects relationship identifier (address), optionally a predetermined effect data item and one or more variables (?business, ?someaddress) suitable for substituting the user's data items.

The predetermined effects criteria take the relevant user data determined by the applicability criteria and by the further application of refinement rules to the user specific data in order to construct a further refinement of the user specific data. Processing the effects criteria involves substituting each of the data items in the applicability criteria data list (list 3) into corresponding variables in the effect criteria (list 4). For example business1 and business3 are substituted in turn into the ?business variable of the address(?business, ?someaddress) effects criterion, together with address1 which is substituted into the ?someaddress variable. Again the effects criteria with substitutions are matched against user data statements, and in this case the only match is for business1. Therefore the ?business list has business3 deleted, because it doesn't match any user data statements when substituted into the effects criterion.

Business1 is then substituted into the second effects criterion and matched against the user data statements, which results in "phone" being removed from the ?service2 variable list. This is because "phone" was related to business3 which has been deleted. The remaining data items list or user specific data following processing of the effects criteria is as follows:

List 5

?business = {business1}
?service1 = {video}
?service2 = {broadband}
?someaddress = {address1}

The data items in the effects criteria data list (list 5) are then applied to predetermined query generator statements (680) again related to the applicability and effects criteria, and the particular PBX options these entail. Example query generator statements for the first set of applicability and effects criteria are as follows:

List 6 solution (?pbx, ?service1)
solution (?pbx, ?service2)
qos(?pbx, high)
installIn (?pbx, cat1)

The user specific data is applied to the user specific query generator statements. Here some of the data items from the effects criteria data list (list 5) are then substituted with corresponding variables in the query generator statements (list 6) as follows:

List 7 solution (?pbx, video)
solution (?pbx, broadband)
qos(?pbx, high)
installIn (?pbx, cat1)

This then provides a user specific query which can be displayed to the user in a screen (420) as shown in FIG. 4—this particular one is the top left user specific query. The system then processes other sets of applicability criteria, effects criteria, and query generator statements in turn, until a number of user specific queries are generated. It may be the case that some sets of criteria do not produce any applicability or effects data lists (user specific data), in which case the particular PBX options to which they relate are not relevant to the user.

Another example set or group of applicability, effects and query generator statements are as follows, and produce the top right user specific query (420) in FIG. 4.

List 2b isa(medical, ?business)
noEmployees(cat3, ?business)
installSpace(?someaddress, cat2)
lasttwoused (?business, ?service1, ?service2)

List 3b

?business = { business2, business4}
?service1 = {conferencing}
?service2 = {broadband, video}
?someaddress = {address4}

List 4b address (?business, ?someaddress)
lasttwoused (?business, ?service1, ?service2)

List 5b

?business = {business4}
?service1 = {conferencing}
?service2 = {broadband}
?someaddress = {address4}

List 6b solution (?pbx, ?service1)
solution (?pbx, ?service2)
qos(?pbx, med)
installIn (?pbx, cat2)

List 7b solution (?pbx, conferencing)
solution (?pbx, broadband)
qos(?pbx, med)
installIn (?pbx, cat2)

Having obtained all the user specific queries, the query generator 534 may either feed them back to the user interface 532 for display and further selection by the user, or feed them forward to the query engine 536 for application to the services database 360 (690). The results of the user specific queries can then be feed to the user interface for display to the user. The results can be displayed in groups associated with the specific queries, or in any other way depending on system configuration.

In an alternative embodiment, only the applicability query statements are used, and the effects query statements are dispensed with. Thus the user specific data (list 3) derived from the applicability query statements (list 2) is applied directly to the query generator statements (list 6) in order to obtain a modified set of user specific query statements (alternative list 7).

In a further alternative embodiment, a further set or round of query statements is applied to the user specific data in order to obtain further refined user specific data. Thus for example, following obtaining user specific data using the above applicability query statements (list 2), and the effects query statements (list 4) in order to get a refined user specific data set (list 5), these user specific data are further refined by application to another set of query statements.

In a further embodiment the production of applicability and effects criteria data lists (eg lists 3, 3b and 5, 5b) or user specific data can be further refined by the use of qualification operators associated with the applicability query statements and effect query statements. In one such embodiment there are three qualification operators forEach, forAny and forAll.

Application of a query statement that has a forEach qualification will result in that statement being applied against every data item in Table 1, Table 2 and List 1 as in the embodiment noted above.

Application of a query statement that has a forAny qualification will result in a statement being applied until one match is found, at which time the application process will be stopped, and the production of user specific queries will rely on the data items identified to that point.

Application of an effect query statement that has a forAll qualification will result in this statement being applied against all items in list 5 and 5b (and user specific data derived from any other sets of applicability and effects criteria) to produce a complete expansion of all the possible combination of items resulting from this application.

The user specific queries may relate to compound services, that is services which must be supplied by two or more service providers. In this case the query engine may divide the user specific queries into parts as appropriate and query a number of service provider databases in order to find combinations of results which support the whole user specific query. Such query engines and methods of searching for compound service are known for example from the following http website: www.csd.abdn.ac.uk/.about.tnorman/publications/ai2003b.pdf. However any suitable query engine may be used in an embodiment.

Whilst the embodiments have been described with respect to PBX related queries, they could be applied to any database query, for example related to travel, the provision of information technology information, goods or services, or any web-site store.

The user specific queries could be formed into SQL queries, XML queries, or any other known type of query format.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A method of generating a database query, the method comprising:
   receiving a user selection of one of a number of predetermined generic database queries from a user;
   automatically generating user specific data from a user profile corresponding to the user, the user profile data comprising a user data statement table comprising a number of user data statements, wherein each user data statement comprises a relationship identifier and two or more data items, the user specific data being generated by:
   i) generating a user data items list comprising all of the data items comprised in the user data statement table;
   ii) for each of a set of predetermined applicable query statements, each of the applicable query statements comprising an applicable relationship identifier, an applicable data item and a variable, inserting each of the data items held in the user data statement table into the applicable query statement and storing the applicable query statement in an applicability criteria data set if it matches one of the user data statements held in the user data statement table;
   iii) for each of a set of predetermined effects query statements, each of the effects query statements comprising an effects relationship identifier and a variable, inserting each of the elements of the applicability criteria data set into the effects query statement and storing it in the user specific data if it matches one of the user data statements held in the user data statement table; and
   automatically applying the user specific data to a number of user specific generator query statements in order to generate one or more user specific queries.

2. A method according to claim 1, wherein the predetermined query statements are dependent on data stored in the database.

3. A method according to claim 1, further comprising querying the database using the user specific queries.

4. A method according to claim 1, further comprising:
receiving a user selection of one or more of the generated user specific queries in response to providing the user with the generated user specific queries; and querying the database using the selected user specific queries.

5. A method according to claim 1, wherein the user specific queries are formed in two or more parts, and said query parts are used to query respective two or more databases.

6. A non-transitory processor-readable medium storing processor code which when executed on a processor causes the processor to carry out a method according to claim 1.

7. A system for generating a database query, the system comprising:
a user interface configured to receive a user selection from a user of one of a number of predetermined generic database queries;
a processor which is coupled to a query statements database having a number of predetermined query statements and user specific query generator query statements associated with respective generic database queries, the processor also coupled to a user profile database having user profile data associated with the user, the user profile data comprising a user data statement table having a number of user data statements each comprising a relationship identifier and two or more data items;
the processor configured to:
automatically generate user specific data from the user profile data corresponding to the user, the user profile data comprising a user data statement table comprising a number of user data statements, wherein
each user data statement comprises a relationship identifier and two or more data items, the user specific data being generated by:
a) generating a user data items list comprising all of the data items comprised in the user data statement table;

b) for each of a set of predetermined applicable query statements, each of the applicable query statements comprising an applicable relationship identifier, an applicable data item and a variable, inserting each of the data items held in the user data statement table into the applicable query statement and storing the applicable query statement in an applicability criteria data set if it matches one of the user data statements held in the user data statement table;

c) for each of a set of predetermined effects query statements, each of the effects query statements comprising an effects relationship identifier and a variable, inserting each of the elements of the applicability criteria data set into the effects query statement and storing it in the user specific data if it matches one of the user data statements held in the user data statement table;

the processor further configured to
automatically apply the user specific data to a number of the user specific generator query statements in order to generate one or more user specific queries.

8. A system according to claim 7, further comprising a search engine arranged to search an information database using the user specific queries.

9. A system according to claim 8, further comprising the query statements database, and wherein the predetermined query statements are dependent on data stored in the information database.

10. A method according to claim 1, further comprising receiving a user identifier and determining which of the user profile data to apply based on the received user identifier.

11. A system according to claim 7, wherein the processor is further configured to receive a user identifier and determine which of the user profile data to apply based on the received user identifier.

* * * * *